(12) United States Patent
Kase et al.

(10) Patent No.: US 10,254,635 B2
(45) Date of Patent: Apr. 9, 2019

(54) LIGHT SOURCE UNIT AND PROJECTOR

(71) Applicant: CASIO COMPUTER CO., LTD., Tokyo (JP)

(72) Inventors: Toshifumi Kase, Fuchu (JP); Hirofumi Fujikura, Hino (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/788,358

(22) Filed: Oct. 19, 2017

(65) Prior Publication Data

US 2018/0180973 A1 Jun. 28, 2018

(30) Foreign Application Priority Data

Dec. 22, 2016 (JP) ................. 2016-248904

(51) Int. Cl.
| | |
|---|---|
| *G03B 21/20* | (2006.01) |
| *F21V 15/01* | (2006.01) |
| *G03B 21/14* | (2006.01) |
| *F21V 31/00* | (2006.01) |
| *G03B 21/00* | (2006.01) |

(52) U.S. Cl.
CPC .......... *G03B 21/145* (2013.01); *F21V 31/005* (2013.01); *G03B 21/20* (2013.01); *F21V 15/01* (2013.01); *G03B 21/008* (2013.01)

(58) Field of Classification Search
CPC .. G03B 21/2093; G03B 21/20; G03B 21/145; H04N 9/3141; F21V 15/01; F21V 15/012; F21V 15/013
USPC ................... 353/119; 362/374, 375
See application file for complete search history.

(56) References Cited

U.S. PATENT DOCUMENTS 6,757,155 B2 * 6/2004 Koike .................. H05K 5/0043
174/564

FOREIGN PATENT DOCUMENTS

JP 2013-196946 A 9/2013

* cited by examiner

*Primary Examiner* — Ryan D Howard
(74) *Attorney, Agent, or Firm* — Fitch, Even, Tabin & Flannery LLP (57) ABSTRACT

There is provided a light source unit comprising a sealing member, a holding member on which an abutment surface is formed, which has an engaging portion and which holds a part, a case on which an abutted surface is formed which is brought into abutment with the abutment surface via the sealing member, which has an engaged portion which is brought into engagement with the engaging portion and which holds the holding member, wherein the abutment surface of the holding member and the abutted surface of the case face each other and are inclined relative to a holding surface which holds the part, and the abutted surface of the case is inclined so as to face a side where the holding member is inserted.

12 Claims, 7 Drawing Sheets

LIGHT SOURCE UNIT AND PROJECTOR

CROSS-REFERENCE TO RELATED APPLICATION

This application is based upon and claims the benefit of priority under 35 USC 119 from Japanese Patent Application No. 2016-248904 filed on Dec. 22, 2016, the entire disclosure of which, including the specification, claims, drawings and abstract, is incorporated herein by reference.

BACKGROUND OF THE INVENTION

Field of the Invention

The present invention relates to a light source unit and a projector which includes this electronic device.

Description of the Related Art

In these days, data projectors are widely used on many occasions as a projection system for projecting a screen and a video screen of a personal computer and images based on image data recorded on a memory card or the like. In these data projectors, light emitted from a light source is collected on a micromirror display device called a DMD (Digital Micromirror Device) or a liquid crystal panel, and a color image is displayed on a screen.

A projector disclosed in Japanese Unexamined Patent Application No. 2013-196946 includes light source devices such as a red light source device which is made up of a red light emitting diode, an excitation light shining device which doubles as a blue light source device and which is made up of a plurality of blue laser diodes and the like. Excitation light from the excitation light shining device is shone on to a luminescent wheel, and green luminous light is emitted from the luminescent wheel. Then, red, green and blue light source lights are shone on to a display device, and the display device emits image light via a projection-side optical system, whereby a color image is projected on to a screen.

When dust intrudes into a projector to adhere to lenses, mirrors, light sources and the like which are used therein, there may be a risk of reducing the quality of an image resulting from failure of pixels or irregularity in color. To avoid this problem, it is important for a projector to prevent the intrusion of dust thereinto to reduce the risk of dust adhering to its optical parts. A plurality of optical parts or units such as laser diodes, LEDs and a display device are assembled into a light source unit which is installed in a projector, and therefore, it becomes important to seal up locations where the optical parts or units are joined together.

In a conventional sealing method, however, since the property of being airtight is ensured by closing airtight a gap between joint surfaces of the optical parts or units with an adhesive or covering joint portions of the optical parts or units with a tape after the optical parts or units have been installed in a light source unit or a projector, the number of manhours is increased, which makes it difficult to enhance the reliability of the resulting sealing constructions. In addition, there is a sealing or closing method using cushions, and in this closing method, a very small cushion needs to be disposed for each gap between joint surfaces of optical parts or units. Since there exist several locations where the optical parts or units are installed, there is a case where an optical part or unit is fixed from a different direction from a direction in which the optical part or unit and a casing member are arranged (for example, a horizontal direction in relation to a sealing surface), and it becomes difficult for a cushion that is to be held between the members to be so attached due to its repulsive force.

SUMMARY OF THE INVENTION

The present invention has been made in view of the problems described above, and an object thereof is to provide a light source unit which improves the facility with which constituent parts are attached and a projector which uses this light source unit.

According to an aspect of the invention, there is provided a light source unit including a sealing member, a holding member on which an abutment surface is formed, which has an engaging portion and which holds a part, a case on which an abutted surface is formed which is brought into abutment with the abutment surface via the sealing member, which has an engaged portion which is brought into engagement with the engaging portion and which holds the holding member, wherein the abutment surface of the holding member and the abutted surface of the case face each other and are inclined relative to a holding surface which holds the part, and the abutted surface of the case is inclined so as to face a side where the holding member is inserted.

According to another aspect of the invention, there is provided a projector including the light source unit described above, a display device on to which light source light from the light source unit is shone to thereby form image light, a projection-side optical system for projecting the image light emitted from the display device on to a screen, and a control unit for controlling the display device and the light source unit.

DETAILED DESCRIPTION OF THE PREFERRED EMBODIMENT

Figure 1:
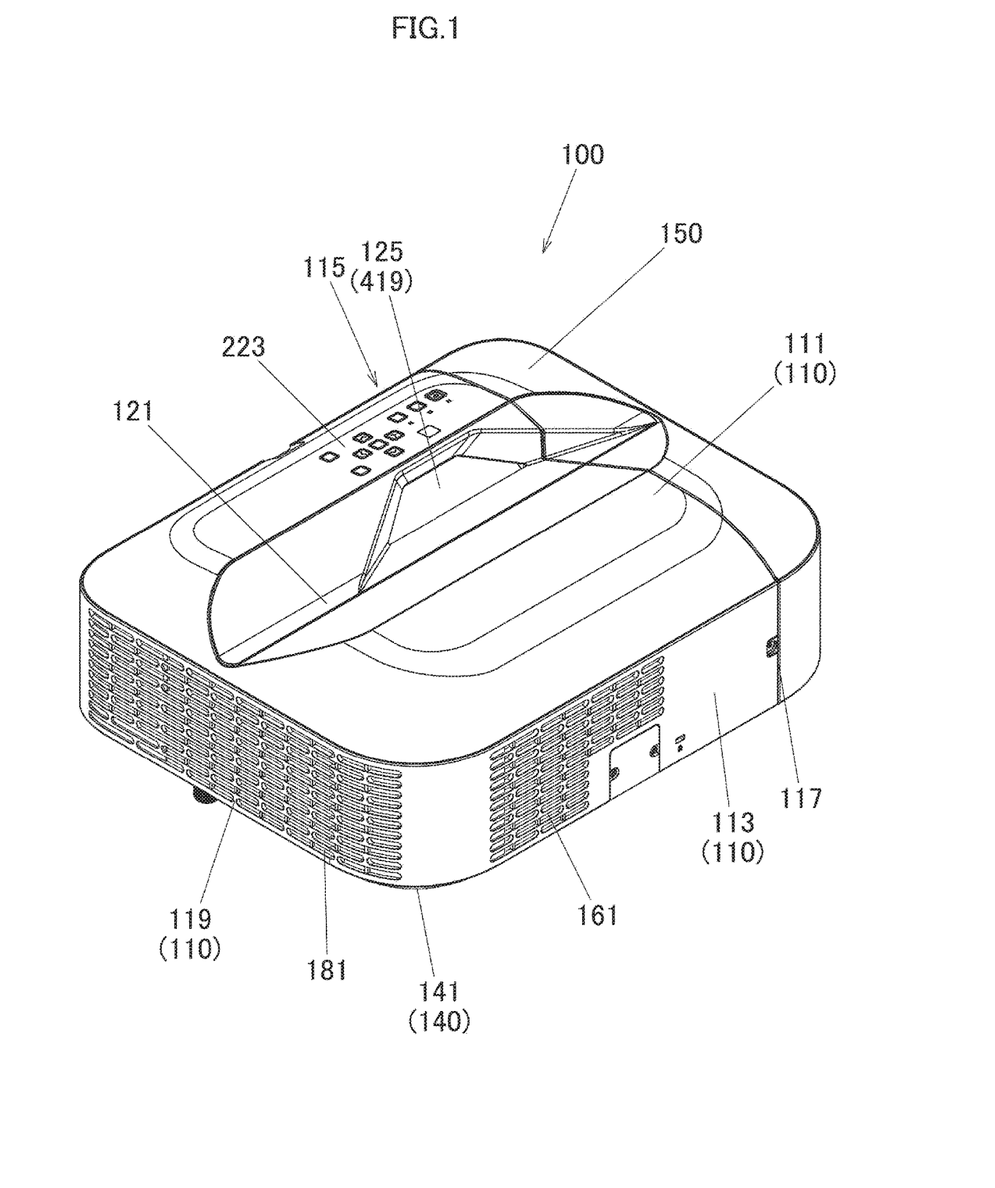
FIG. 1 is an external perspective view of a projector according to an embodiment of the invention.

Hereinafter, a mode for carrying out the invention will be described. FIG. 1 is an external perspective view of a projector 100 according to an embodiment of the invention. In describing a main body of the projector 100, when left and right are referred to in relation to the main body of the projector 100, they denote, respectively, left and right in relation to a projecting direction of the projector 100, and when front and rear are referred to in relation to the main body of the projector 10, they denote, respectively, front and rear in relation to the projecting direction of the projector 100. In addition, in FIG. 1, a right obliquely downward direction denotes a front of the projector 100.

The projector 100 has a substantially rectangular parallelepiped shape as shown in FIG. 1. The projector 100 is made up of a casing main body including an upper case 110 and a lower case 140 and a connector cover 150 which covers a left panel 117 which can be detachably attached to the casing main body. The connector cover 150 is recessed into a shape which can cover an outer circumferential edge of the left panel 117. Various types of devices and circuit boards on a bottom plate 141 of the lower case 140 are then covered by the upper case 110. The projector 100 has front outside air inlet holes 161 which are formed in a front panel 113 of the upper case 110 and inside air outlet holes 181 which are formed in a right panel 119. The projector 100 also has back outside air inlet holes and a hole portion from which sound from a speaker is emitted which are formed in a back panel 115.

In addition, a keys/indicators unit 223 is provided on an upper panel 111 of the upper case 110. Disposed on this keys/indicators unit 223 are keys and indicators which include a power supply switch key, a projection switch key, a power indicator, an overheat indicator, and the like. The projection switch key switches on or off the projection by the projector 100. The power indicator informs whether a power supply is on or off. The overheat indicator informs of an overheat condition occurring in a light source unit, a display device, a control unit or the like when they really overheat.

Further, a V-shaped cut groove 121 is formed on the upper panel 111 of the upper case 110 so as to extend in a left-right or transverse direction thereof from a right side of the casing main body to the connector cover 150 which is provided on a left side of the casing main body. A projection port 125 is formed in the cut groove 121, so that image light can be emitted obliquely to the front from the projection port 125.

Although not shown in the drawings, provided in the left panel 117 are various types of terminals (a group of terminals) such as a video signal input D-SUB terminal into which analog RGB video signals are inputted, an S terminal, an RCA terminal, a voice output terminal, a power supply adaptor and a plug. Side front outside air inlet holes are also in the left panel 117.

Figure 2:
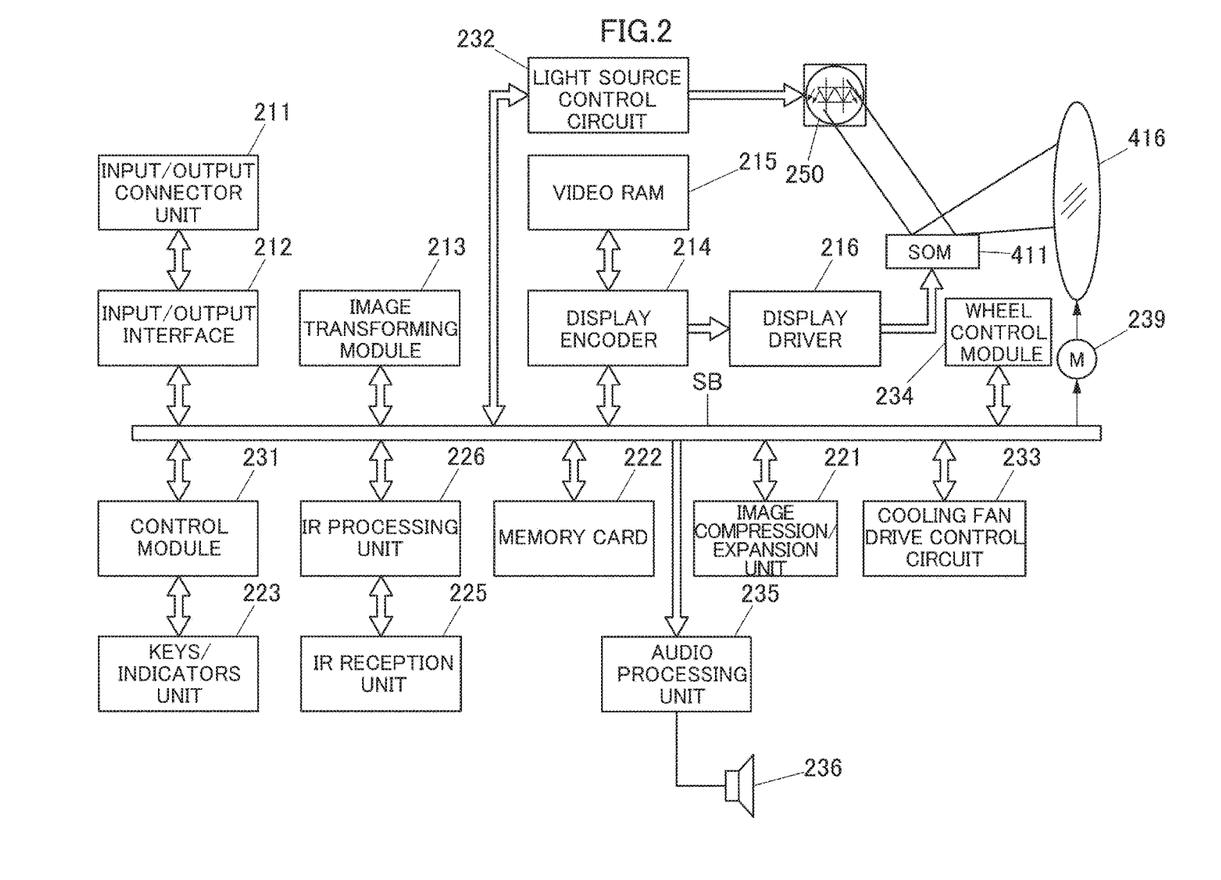
FIG. 2 is a block diagram showing functional blocks of the projector according to the embodiment of the invention.

Next, a projector control unit of the projector 100 will be described by the use of a functional block diagram shown in FIG. 2. The projector control unit 231 includes a control module 231, an input/output interface 212, an image transforming module 213, a display encoder 214, a display driver 216 and the like.

Image signals of various standards which are inputted from the input/output connector unit 211 are sent via the input/output interface 212 and a system bus (SB) to the image transforming module 213 where the image signals are transformed so as to be unified into an image signal of a predetermined format which is suitable for display by the projector control unit 231. Thereafter, the image signals so transformed are outputted to the display encoder 214.

Then, the control module 231 governs the control of respective operations of circuitries within the projector 100 and is made up of a CPU configured as an arithmetic unit, a ROM which stores in a fixed fashion operation programs of various types of settings, a RAM which is used as a working memory and the like.

The display encoder 214 deploys the image signals which have been inputted thereinto on a video RAM 215 for storage therein and generates a video signal from the contents stored in the video RAM 215, outputting the video signal so generated to the display driver 216.

The display driver 216 functions as a display device control module. The display driver 216 drives a display device 411, which is a spatial optical modulator (SOM), at an appropriate frame rate according to the image signal outputted from the display encoder 214. The projector 100 includes a light source unit 250.

The control module 231 controls a light source control circuit 232 which is configured as a light source control unit. The light source control circuit 232 controls not only the emission of light from each of an excitation light shining device 310 and a red light source device 350 of the light source unit 250 but also the rotation of a luminescent plate 331 (refer to FIG. 3) of a green light source device 330 via a wheel control module 234 so that light source lights of predetermined wavelength ranges which are required in producing an image are emitted from the light source unit 250.

In the projector 100, a pencil of light emitted from the light source unit 250 is shone on to the display device 411 to thereby form an optical image using reflected light from the display device 411, and the optical image so formed is then projected on to a screen or the like for display thereon via a projection optical system.

This projection optical system has a movable lens group 416, and this movable lens group 416 is driven by a lens motor 239 for zooming or focusing.

When the projector 100 is in a reproducing mode, an image compression/expansion unit 221 performs the following operations. The image compression/expansion unit 221 reads out image data recorded on a memory card 222 and expands individual pieces of image data which make up a series of dynamic images frame by frame. Then, the image compression/expansion unit 221 outputs the image data to the display encoder 214 via the image transforming module 213 so as to enable the display of dynamic images and the like based on the image data stored on the memory card 222.

Then, operation signals generated at the keys/indicators unit 223 which is provided on the upper case 110 are sent out to the control module 231 immediately after they are generated. Key operation signals from a remote controller are received by an IR reception unit 225, and a code signal demodulated at an IR processing unit 226 is outputted to the control module 231.

An audio processing unit 235 is connected to the control module 231 via the system bus (SB). This audio processing unit 235 includes a circuitry for a sound source such as a PCM sound source or the like. When the projector 100 is in a projection mode and the reproducing mode, the audio processing unit 235 converts audio data into analog signals and drives a speaker 236 to output loudly sound or voice based on the audio data.

Further, the control module 231 causes a cooling fan drive control circuit 233 to detect temperatures through a plurality of temperature sensors which are provided in the light source unit 250 so as to control the rotating speeds of cooling fans based on the results of the temperature detections. Additionally, the control module 231 also causes the cooling fan drive control circuit 233 to keep the cooling fans rotating by use of a timer even after the power supply to the main body of the projector 100 is switched off. Alternatively, the control module 231 causes the cooling fan drive control circuit 233 to cut off the power supply to the main body of the projector 100 depending upon the results of the temperature detections by the temperature sensors.

Figure 3:
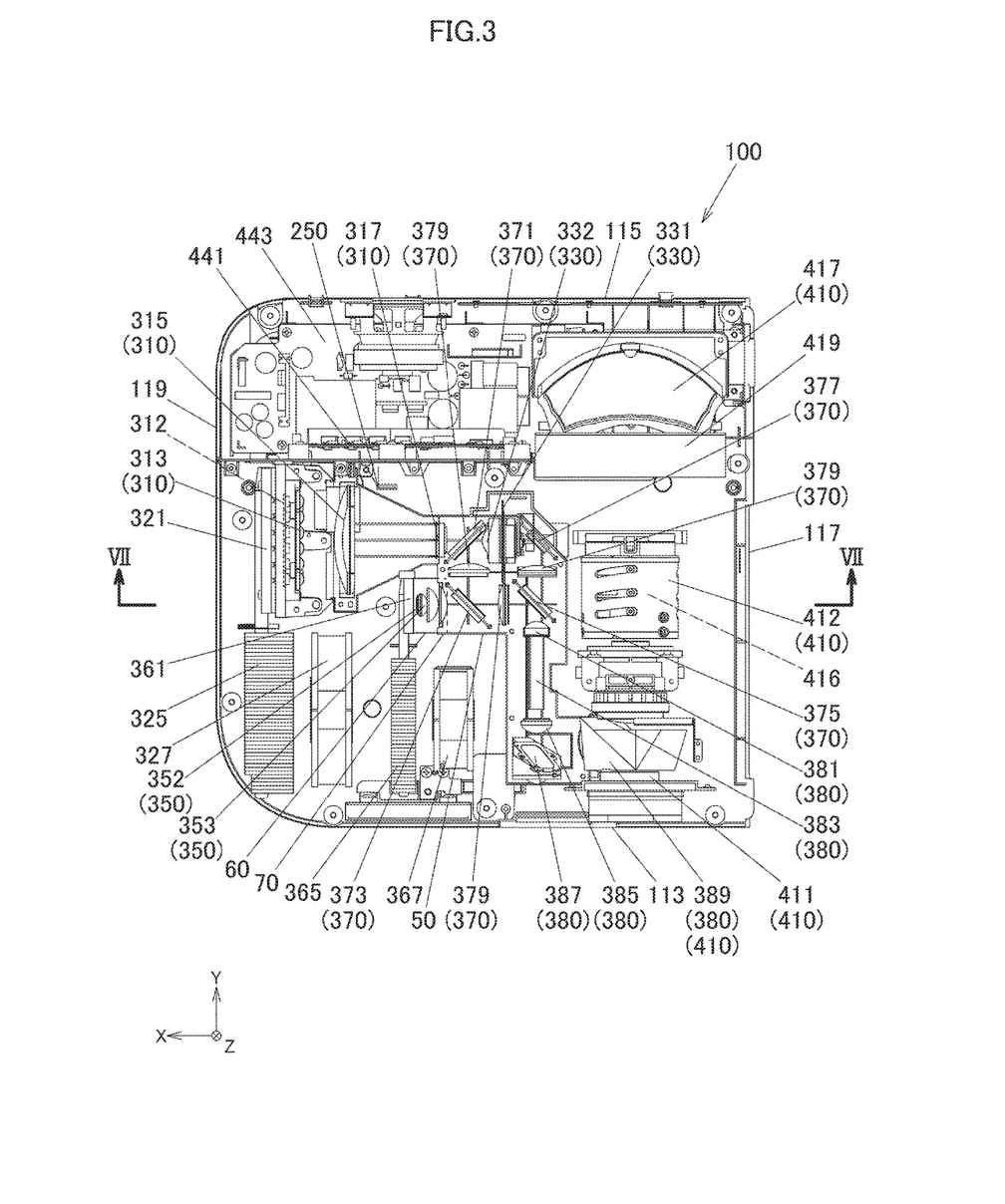
FIG. 3 is a schematic plan view showing an internal construction of the projector according to the embodiment of the invention.

Next, an internal construction of the projector 100 will be described. FIG. 3 is a schematic plan view showing an internal construction of the projector 100. The projector 100 includes a main control circuit board 441 and a power supply control circuit board 443 which are provided near the back panel 115.

The light source unit 250 has the green light source device 330 within a light source case 50. Additionally, the light source unit 250 includes a light guiding optical system 370 and a light source-side optical system 380 as a light guiding path. In FIG. 3, an upper case of the light source case 50 is omitted from illustration.

The excitation light shining device 310 is disposed near the right panel 119 within the casing of the projector 100. A plurality of blue laser diodes 312, which are semiconductor light emitting devices, are provided in the excitation light shining device 310. Collimator lenses 313 are disposed individually on optical axes of the blue laser diodes 312 to convert lights emitted from the blue laser diodes 312 into parallel lights so as to enhance the directivity thereof. In this embodiment, a total of 12 blue laser diodes 312 are disposed into a configuration of two rows and six columns, and a total of 12 collimator lenses 313 are also disposed into a configuration of two rows and six columns.

A collective lens 315 is provided in front of the collimator lenses 313. The collective lens 315 collects lights of a range of blue wavelengths which are emitted from the collimator lenses and guides them on to a diffusion plate 317. The diffusion plate 317 transmits the lights of the range of blue wavelengths which are incident thereon while diffusing them and guides them on to the green light source device 330.

The red light source device 350 includes a red light source 352 and a collective lens group 353. The red light source 352 is a red light emitting diode which is a semiconductor light emitting device for emitting light of a range of red wavelengths. The constituent members of the red light source device 350 such as the red light source 352 and the collective lens group 353 are held by a holding member 60. The holding member 60 is fixed to the light source case 50 with an attaching portion 70. The red light source 352 is disposed so that its optical axis becomes parallel to light emitted from each of the blue laser diodes 312. The collective lens group 353 collects light of the range of red wavelengths emitted from the red light source 352.

The red light source device 350 includes a heat sink 365 on a side of the red light source 352 which faces the front panel 113, and this heat sink 365 is connected to the red light source 352 via a heat conducting portion 361. The excitation light shining device 310 includes a heat sink 325 on sides of the blue laser diodes 312 which face the front panel 113, and this heat sink 325 is connected to the blue laser diodes 312 via a heat transmitting portion 321. A cooling fan 327 is disposed between the heat sink 325 and the heat sink 365. A cooling fan 367 is also disposed on a side of the heat sink 365 which faces the left panel 117. Cooling air generated by the cooling fan 327 and cooling air generated by the cooling fan 367 are sent to the heat sink 325 of the excitation light shining device 310 and the heat sink 365 of the red light source device 350, respectively. Thus, the blue laser diodes 312 and the red light source device 352 are cooled by the corresponding heat sinks 325, 365, respectively.

The luminescent plate 331, which makes up the green light source device 330, is disposed substantially at a center of the projector 100. The luminescent plate 331 has a circular disc shape and is disposed on an optical path of excitation light emitted from the excitation light shining device 310. The luminescent plate 331 is driven to rotate by a motor.

A collective lens group 332 is disposed on a side of the luminescent plate 331 which faces the excitation light shining device 310, and a collective lens (not shown) is also disposed on a side of the luminescent plate 331 which is an opposite side of the luminescent plate 331 to the side facing the excitation light shining device 310 which faces a reflection mirror 377.

The collective lens group 332 collects a pencil of excitation light which is emitted from the excitation light shining device 310 and which passes through a first dichroic mirror 371 on to the luminescent plate 331 and also collects luminous light which is emitted from the luminescent plate 331 in the direction of the excitation light shining device 310.

A luminous light emitting area and a transparent light transmitting area are provided continuously in a circumferential direction in an end-to-end fashion. The luminous light emitting area receives light which is emitted from the excitation light shining device 310 and is then collected on to it via the collective lens group 332 as excitation light and emits luminous light of a range of green wavelengths. The transparent light transmitting area transmits excitation light emitted from the excitation light shining device 310 or transmits excitation light emitted from the excitation light shining device 310 while diffusing it.

A metallic base material made up of copper or aluminum can be used for a base material of the luminescent plate 331.

An annular groove is formed on a surface of the base material which faces the excitation light shining device 310. A bottom portion of this groove is mirror finished through silver deposition or the like, and a green luminescent material layer is laid out on the bottom portion. In the transparent light transmitting area, a transparent base material having a light transmitting property is fitted in a cut-out through hole portion in the base material. In a case where an area which transmits excitation light while diffusing it is disposed as the transparent light transmitting area, a transparent material on a surface of which minute irregularities are formed through sandblasting is fitted in the cut-out through hole portion.

When light of a range of blue wavelengths which is emitted from the excitation light shining device 310 is shone on to the green luminescent material layer of the luminescent plate 331, a green luminescent material is excited to emit light of the green wavelengths is emitted in every direction. The luminous light of the green wavelengths which is emitted in a luminescent fashion is emitted towards the right panel 119 to be incident on the collective lens group 332. On the other hand, the light of the range of blue wavelengths emitted from the excitation light shining device 310 which is then incident on the transparent light transmitting area passes through the luminescent plate 331 or passes through the luminescent plate 331 while being diffused and is then incident on the collective lens, not shown, which is disposed on the back side (in other words, the side facing the left panel 117) of the luminescent plate 331.

The light guiding optical system 370 includes collective lenses which collect a pencil of light of the range of blue wavelengths, a pencil of light of the range of red wavelengths and a pencil of light of the range of green wavelengths and reflection mirrors and dichroic mirrors which turn axes of the pencils of light of the blue, red and green wavelength ranges so as to direct them in the same direction. Specifically speaking, the light guiding optical system 370 includes the first dichroic mirror 371, a second dichroic mirror 373, a third dichroic mirror 375, the reflection mirror 377 and a plurality of collective lenses 379.

The first dichroic mirror 371 is disposed between the diffusion plate 317 and the collective lens group 332. The first dichroic mirror 371 transmits light of the range of blue wavelengths and reflects light of the range of green wavelengths. Light of the range of green wavelengths which is emitted from the luminescent plate 331 is reflected by the first dichroic mirror 371 and is guided to the second dichroic mirror 373 by way of the collective lens 379.

The second dichroic mirror 373 is disposed in a position where light of the range of green wavelengths which is emitted from the first dichroic mirror 371 intersects light of the range of red wavelengths which is emitted from the red light source device 450. The second dichroic mirror 373 reflects light of the range of green wavelengths and transmits light of the range of red wavelengths. The light of the range of green wavelengths which is emitted from the first dichroic mirror 371 is reflected by the second dichroic mirror 373 and is then guided to the third dichroic mirror 375 by way of the collective lens 379 which is disposed on the side of the luminescent plate 331 which faces the left panel 117.

Light of the range of red wavelengths which is emitted from the red light source device 350 passes through the second dichroic mirror 373, and an axis of the red light so emitted coincide with an axis of the light of the range of green wavelengths. Thereafter, the light of the range of red wavelengths is guided to the third dichroic mirror 375 by way of the collective lens 379.

On the other hand, in the light of the range of blue wavelengths which is emitted from the excitation light shining device 310 and is diffused by the diffusion plate 317, the light of the range of blue wavelengths which is incident on the light transmitting area of the luminescent plate 331 is reflected by the reflection mirror 377 and is then guided to the third dichroic mirror 375 by way of the collective lens 379.

The third dichroic mirror 375 reflects light of the range of green wavelengths and light of the range of red wavelengths and transmits light of the range of blue wavelengths. Thus, the axis of the light of the range of green wavelengths which is reflected by the second dichroic mirror 373 and the axis of the right of the range of red wavelengths which passes through the second dichroic mirror 373 are turned by the third dichroic mirror 375 and are then incident on a collective lens 381 of the light source-side optical system 380. On the other hand, the light of the range of blue wavelengths which is reflected by the reflection mirror 377 passes through the second dichroic mirror 375 and is then guided to the collective lens 381 of the light source-side optical system 380.

In this way, the respective axes of the light of the range of blue wavelengths, the light of the range of red wavelengths and the light of the range of green wavelengths coincide with one another as a result of the blue, red and green lights passing through or being reflected by the third dichroic mirror 375.

The light source-side optical system 380 includes the collective lens 381, a light tunnel 383, a collective lens 385, a reflection mirror 387, and a TIR (Total Internal Reflection) prism (a total reflection prism) 389. The TIR prism 389 also makes up part of a projection-side optical system 410, which will be described later. The collective lens 381 collects light which is emitted from the third dichroic mirror 375. The light of the range of blue wavelengths, the light of the range of red wavelengths and the light of the range of green wavelengths which are collected by the collective lens 381 are then incident on the light tunnel 383. When the pencils of light are incident on the light tunnel 383, their intensities are distributed uniformly by the light tunnel 383.

The collective lens 385 is disposed on an optical axis of the light tunnel 383 which emerges from an end thereof which faces the front panel 113. The pencils of light emitted from the light tunnel 383 are collected by the collective lens 385 and are then shone on to a light shining mirror 387.

The projection-side optical system 410 has the TIR prism 389, a display device 411, a lens barrel 412, and an aspheric mirror 417. The pencils of light which are reflected by the light shining mirror 387 are incident on the TIR prism 389 and are then shone on to an image forming plane of the display device 411 which is disposed on a side of the TIR prism 389 which faces the front panel 113. Image light formed by the display device 411 is shone on to the aspheric mirror 417 by way of a fixed lens group and the movable lens group 416 which are disposed within the lens barrel 412 which is disposed on a side of the TIR prism 389 which faces the back panel 115.

The image light which is reflected by the aspheric mirror 417 is emitted to an exterior portion of the projector 100 by way of a cover glass 419 (also, refer to FIG. 1) and is then projected on to a screen.

By configuring the projector 100 in the way described heretofore, when the luminescent plate 331 rotates and the excitation light shining device 310 and the red light source device 350 emit light at different timings, light of the range of blue wavelengths, light of the range of red wavelengths and light of the range of green wavelengths are incident sequentially on the collective lens 381, the light tunnel 383 and the like of the light source-side optical system 380 by way of the light guiding optical system 370 and are then incident on the display device 411. As this occurs, the blue, red and green lights are reflected in a time-sharing fashion according to data displayed by the display device 411, which is a DMD (Digital Micromirror Device), whereby a color image can be projected on to the screen.

Figure 4:
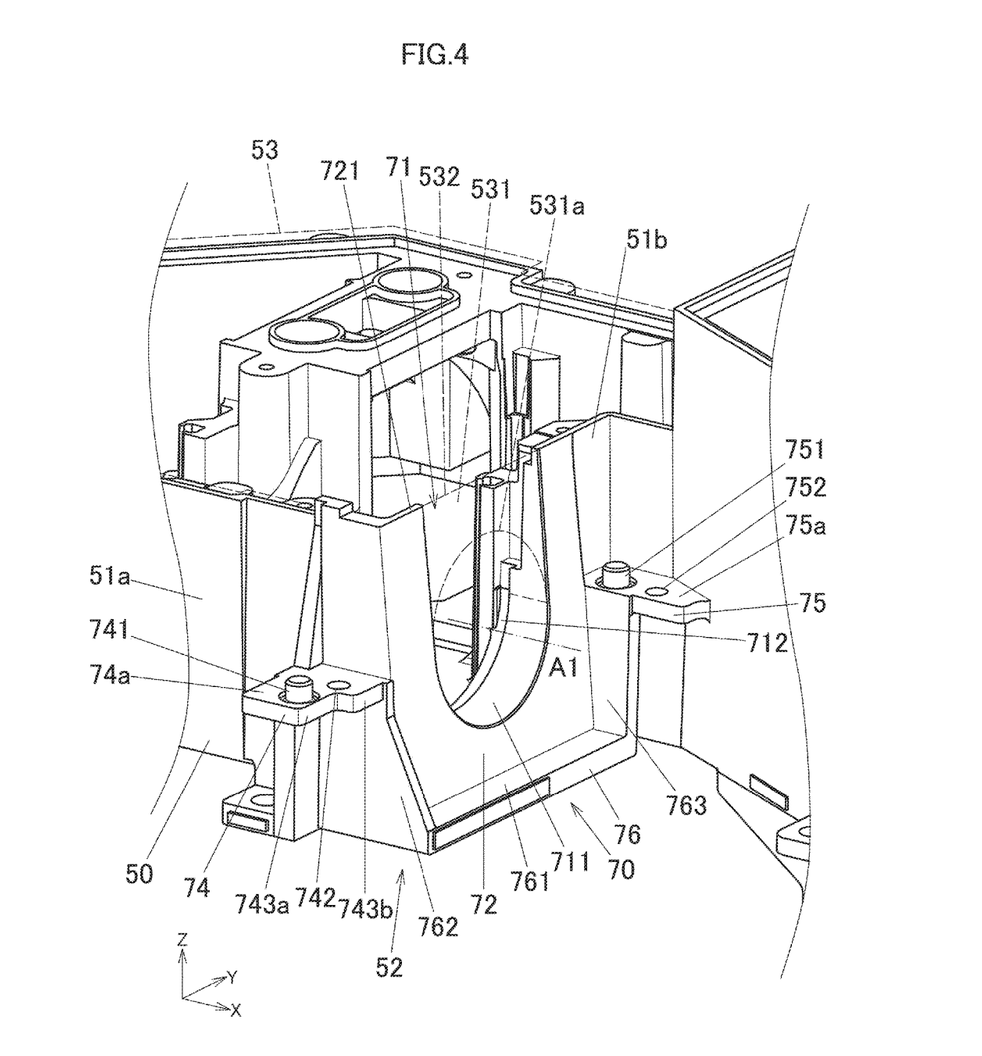
FIG. 4 is a perspective view of a light source case according to the embodiment of the invention which results when seen from an attaching surface side of a holding member.

Next, the configurations of the holding member 60 which holds the red light source device 350 and the attaching portion 70 according to the embodiment will be described. FIG. 4 is a perspective view of the light source case 50 which results when seen from an attaching surface side of the holding member 60. It should be noted that FIG. 4 is the perspective view resulting when the light source case 50 shown in FIG. 3 is seen from a Z axis side. In a description which will be made by reference to FIGS. 4 to 7, a positive direction of the Z axis is referred to as an upward direction, and a negative direction of the Z axis is referred to as a downward direction. In FIG. 4, optical parts which are disposed inside and outside the light source case 50 are omitted from illustration.

A corner portion 52 is formed in the light source case 50 by two side walls 51$a$, 51$b$. The attaching portion 70 is formed on a surface of the side wall 51$b$ including the corner portion 52 from a lower end to an upper end. The attaching portion 70 has a U-shaped cut-out portion 71 which is opened at a top of the side wall 51$b$. A bottom portion 711 of the cut-out portion 71 has a semi-circular concavely curved shape which is centered at a reference axis A1 which is parallel to an X axis. A vertical height of the reference axis A1 in the direction of the Z axis is substantially the same as a height of an axis of light which is guided in the light source case 50. A grooved frame portion 712 for fixing a collective lens which makes up the collective lens group 353 is formed on a side of the cut-out portion 71 which faces an interior of the light source case 50. The grooved frame portion 712 is formed into a substantially circular grooved frame shape which is centered at the reference axis A1.

The attaching portion 70 has an abutted surface 72 with which the holding member 60 is brought into abutment on an external surface of the side wall 51b. The abutted surface 72 is formed as a flat surface which is inclined around a periphery of the cut-out portion 71. The light source case 50 is sealed up by a substantially plate-like lid member 53 which indicated by broken lines from above. The lid member 53 has a fixing plate 531 which is brought into engagement with an inner side of the cut-out portion 71 along a widthwise direction thereof. The fixing plate 531 is formed so as to be curved from an open end portion of the cut-out portion 531 towards the bottom portion 711. A surface of the fixing plate 531 is formed so as to be substantially level with the abutted surface 72. A cut-out portion 531a is formed at a lower end of the fixing plate 531, and this cut-out portion 531a is cut into a semi-circular concavely curved shape. A substantially circular hole portion, which is centered at the reference axis A1, is formed in the cut-out portion 71 by the cut-out portion 531a and the bottom portion 711.

The attaching portion 70 has a first flange portion 74 and a second flange portion 75 on both sides thereof. The first flange portion 74 and the second flange portion 75 are each formed into a plate shape. The first flange portion 74 and the second flange portion 75 are disposed so that the reference axis A1 is included in a plane which includes respective upper surfaces 74a, 75a of the first and second flange portions 74, 75.

A cylindrical positioning projection 741 is formed on the upper surface 74a of the first flange portion 74 so as to rise upwards in the direction of the Z axis (a second direction) which is perpendicular to the direction of the X axis (a first direction) which is an axial direction of the reference axis A1. A threaded hole 742 is formed in the first flange portion 74 to fix the holding member 60, which will be described later, to the attaching portion 70. The threaded hole 742 is disposed on a proximal side of the first flange portion 74. A first side end face 743a and a second side end face 743b are formed on a side end of the first flange portion 74 which faces in a positive direction of the X axis so as to be offset in a step-like fashion in the direction of the X axis.

A cylindrical positioning projection 751 is also formed on the upper surface 75a of the second flange portion 75 so as to rise upwards in the direction of the Z axis. A threaded hole 752 is formed in the second flange portion 75 to fix the holding member 60 to the attaching portion 70. The positioning projection 751 and the threaded hole 752 are provided along the direction of the X axis. The positioning projection 751 is disposed closer to a proximal side of the second flange portion 75 than the threaded hole 752.

The attaching portion 70 has a frame portion 76 (a second frame portion) at a bottom (a negative side in the direction of the Z axis) of the abutted surface 72, and this frame portion 76 has an angularly concave shape when seen from the positive direction of the X axis. The frame portion 76 has a lower plate portion 761 which is formed at a lower end of the abutted surface 72, a side plate portion 762 which is formed at a side end of the abutted surface 72 which faces the first flange portion 74 and a side plate portion 763 which is formed at a side end of the abutted surface 72 which faces the second flange portion 75. The side plate portion 762 is provided between the first flange portion 74 and the lower plate portion 761, and the side plate portion 763 is provided between the second flange portion 75 and the lower plate portion 761.

Figure 5:
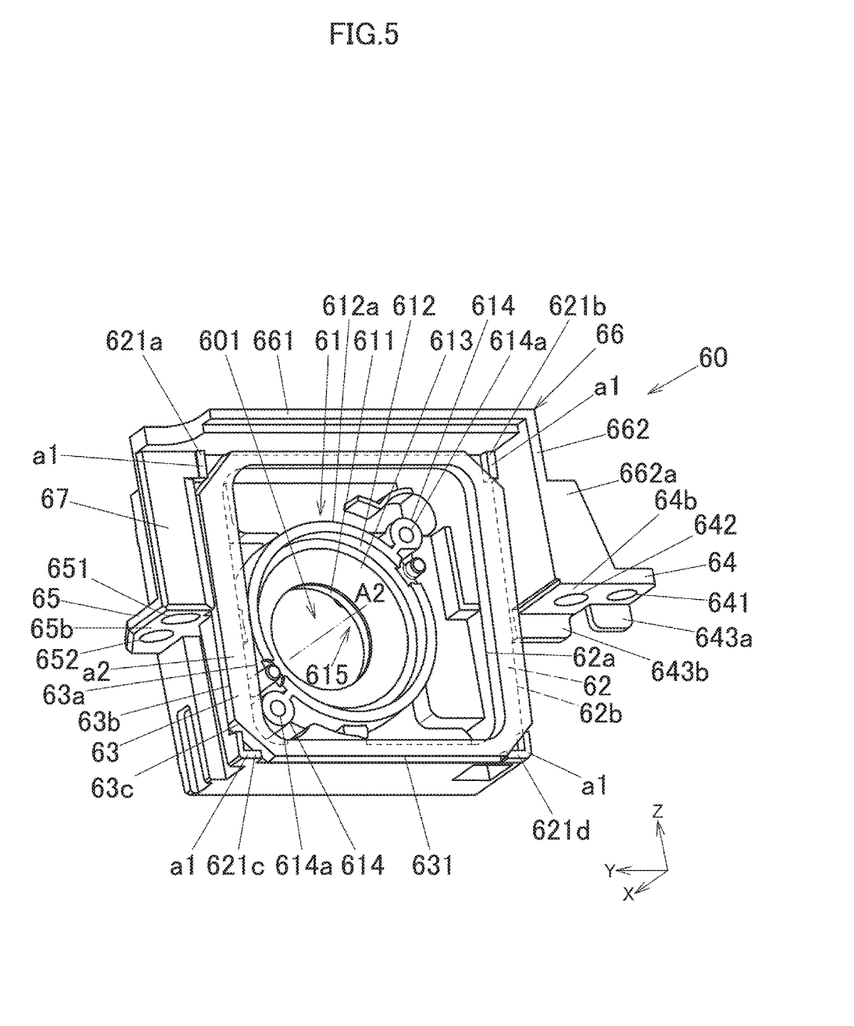
FIG. 5 is a perspective view of the holding member according to the embodiment of the invention which results when seen from the attaching surface side thereof.

FIG. 5 is a perspective view of the holding member 60 when seen from an attaching surface side of the light source case 50. The holding member 60 has a substantially circular through hole 601 at a center thereof and is formed into a substantially quadrangular frame shape as a whole. Two substantially circular grooved frame portions 611, 612 having different bore diameters are formed on an inner circumferential wall of the through hole 601 so as to be centered at a reference axis A2 which is parallel to the X axis. The grooved frame portion 611 and the grooved frame portion 612 are arranged continuously via an inclined portion 613 whose diameter decreases as it extends in the direction of the X axis. Collective lenses which make up the collective lens group 353 shown in FIG. 3 are disposed in the grooved frame portions 611, 612. The grooved frame portion 612 which is disposed nearer to a viewer of FIG. 5 is formed on an inner circumferential surface of a cylindrical rib portion 612a which is provided so as to project towards a negative side of the X axis. Two boss portions 614 each having a threaded hole 614a are formed on an outer circumferential side of the rib portion 612a so as to rise into a cylindrical shape. The collective lens which is disposed in the grooved frame portion 612 is fixed from the negative side of the X axis by a plate member, not shown. The threaded holes 614a are used to fix plate member in place.

Figure 7:
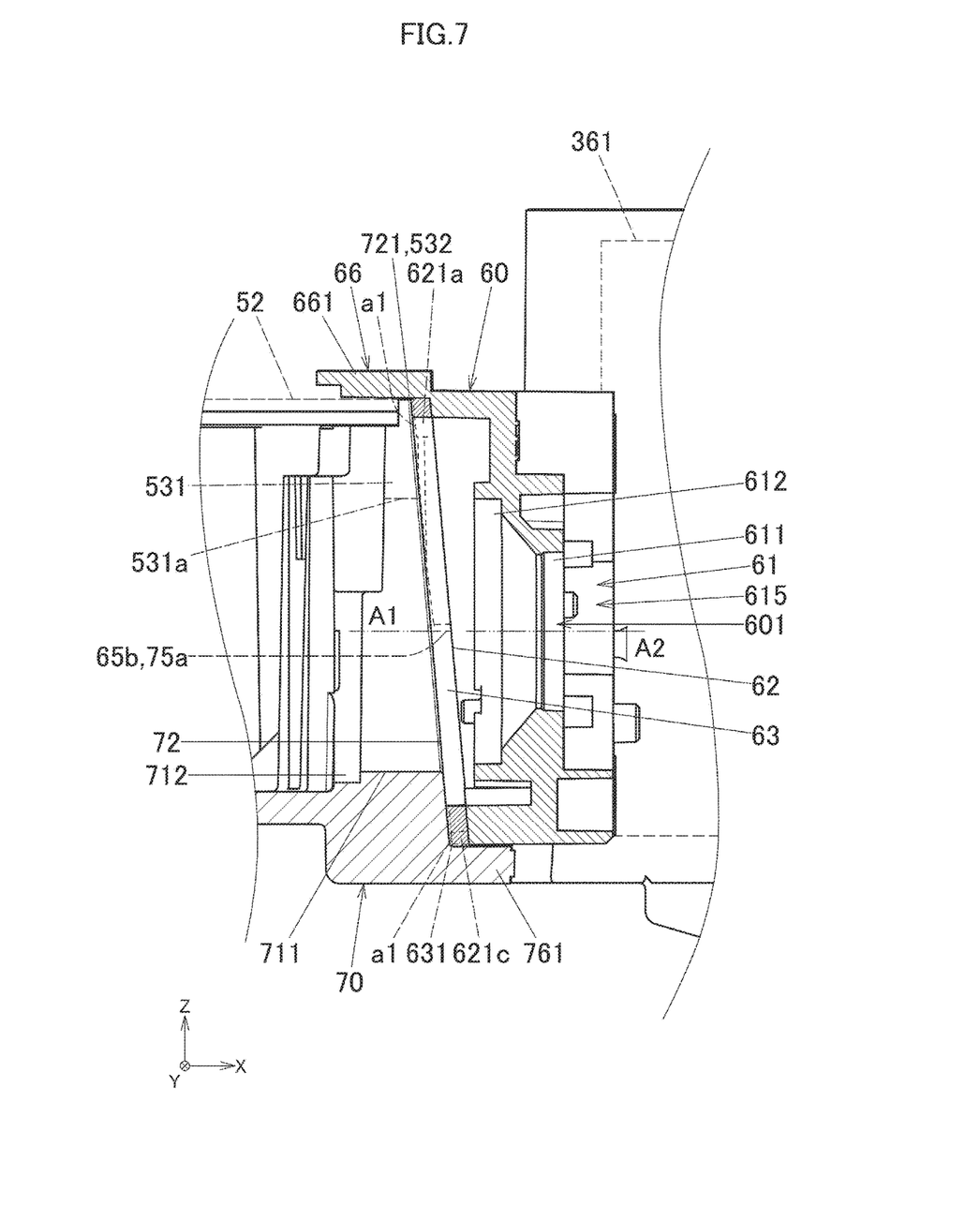
FIG. 7 is a partially enlarged sectional view showing the state in which the holding member is attached to the light source case according to the embodiment of the invention, the partially enlarged sectional view being taken along a line VII-VII in FIG. 3 to show particularly a periphery of the holding member in an enlarged fashion.

The holding member 60 has a fixing portion 615 for fixing the red light source 352 which is shown in FIG. 3 on a side thereof which corresponds to a rear surface side of FIG. 5 (also, refer to FIG. 7). A part holding portion 61 for holding the parts is formed by the grooved frame portions 611, 612 and the fixing portion 615.

An abutment surface 62 is formed around the part holding portion 61 on an end surface (which lies nearer to the viewer of FIG. 5) of the holding member 60. The abutment surface has an inner circumferential edge 62a and an outer circumferential edge 62b which are both formed into a substantially rectangular shape and is formed into a rectangular ring-like shape as a whole. Inner corner portions of the inner circumferential edge 62a of the abutment surface 62 are each formed into an arc shape. A total of four rib portions 621a to 621d is provided at corner portions of the outer circumferential edge 62b of the abutment surface 62 so as to rise upwards. The two upper rib portions 621a, 621b are each formed into a quadrangular prism shape having a substantially rectangular bottom portion. The other lower rib portions 621c, 621d are each formed into a substantially L-like structure by combining two quadrangular prisms in that way. Respective top surfaces al of the rib portions 621a to 621d are formed substantially parallel to the abutment surface 62. Additionally, the top surfaces al are formed so as to be level with one another.

A sealing member 63 is disposed on the abutment surface 62. Materials such as urethane and silicone which are flexible, stretchable and inflammable can be used for the sealing member 63. The sealing member 63 has an inner circumferential edge 63a and an outer circumferential edge 63b which are both formed into a substantially rectangular shape and is formed into a rectangular ring-like shape as a whole. The shape of the inner circumferential edge 63a of the sealing member 63 is substantially the same as the inner circumferential edge 62a of the abutment surface 62. The sealing member 63 is disposed so that the inner circumferential edge 63a substantially coincides with the inner circumferential edge 62a of the abutment surface 62.

C chamfering is applied to the corner portions 63c of the outer circumferential edge 63b of the sealing member 63b. Providing the corner portions 63c allows the sealing member to be disposed on the abutment surface 62 without interfering with the rib portions 621a to 621d. A top surface z2 of the sealing member 63 is formed so as to be substantially parallel to the abutment surface 62.

The holding member 60 has a third flange portion 64 and a fourth flange portion on both sides of an outer surface. The third flange portion 64 and the fourth flange portion 65 are each formed into a plate shape. The third flange portion 64 and the fourth flange portion 65 are disposed so that the reference axis A2 is included in a plane which includes respective lower surfaces 64b, 65b of the third and fourth flange portions 64, 65.

Circular hole portions 641 and 642 are formed in the third flange portion 64 in such a way as to penetrate the third flange portion 64 in the direction of the Z axis. The hole portion 642 is used to fix the holding member 60 to the attaching portion 70. The third flange portion 64 is formed substantially into an L shape when seen from above (refer to FIG. 6A). The third flange portion 64 has flat plate portions 643a, 643b which are provided so as to extend downwards from an end portion of the third flange portion 64 which is formed so as to be offset partially in a step-like fashion in the direction of the X axis.

An elliptically elongated hole portion 651 is formed in the fourth flange portion 65 in such a way as to penetrate the fourth flange portion 65 in the direction of the Z axis. The elongated hole portion 651 is formed so that a major axis thereof is directed towards the hole portion 641 of the third flange portion 64 from a center of the elongated hole portion 651 (also, refer to FIG. 6A). Additionally, a circular hole portion 652 is formed in the fourth flange portion 65 to fix the holding member 60 to the attaching portion 70.

The holding member 60 has a frame portion 66 (a first frame portion) above the abutment surface 62 (on a positive side of the Z axis), and this frame portion 66 is formed substantially into an L shape when seen from a negative direction of the X axis. The frame portion 66 has an upper plate portion 661 which is formed at an upper end of the abutment surface 62 and a side plate portion 662 which is formed at a side end of the abutment surface 62 where the third flange portion 64 is formed. The side plate portion 662 is provided between the third flange portion 64 and the upper plate portion 661. Additionally, a plate-shaped rib plate portion 662a is formed in such a way as to be connected substantially perpendicularly to the side plate portion 662 and the third flange portion 64.

A side plate portion 67 is provided at a side end of the abutment surface 62 where the fourth flange portion 65 is formed. The side plate portion 67 is provided between the upper plate portion 661 and the fourth flange portion 65 in a position which lies lower than the height at which the rib portions 621a to 621d are provided to rise. The side plate portion 67 is disposed so that a surface thereof is directed towards the direction of the X axis.

Figure 6A:
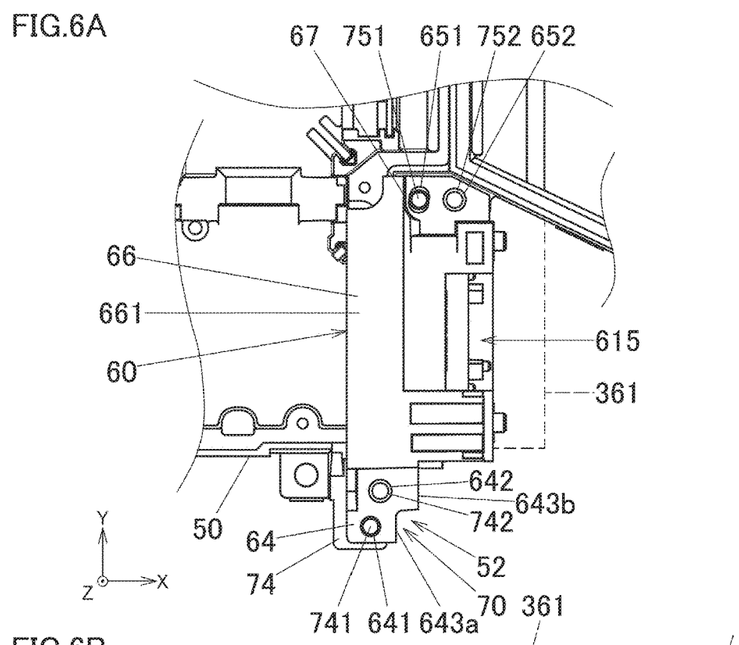
FIG. 6A is a plan view showing a state in which the holding member is attached to the light source case according to the embodiment of the invention.
Figure 6B:
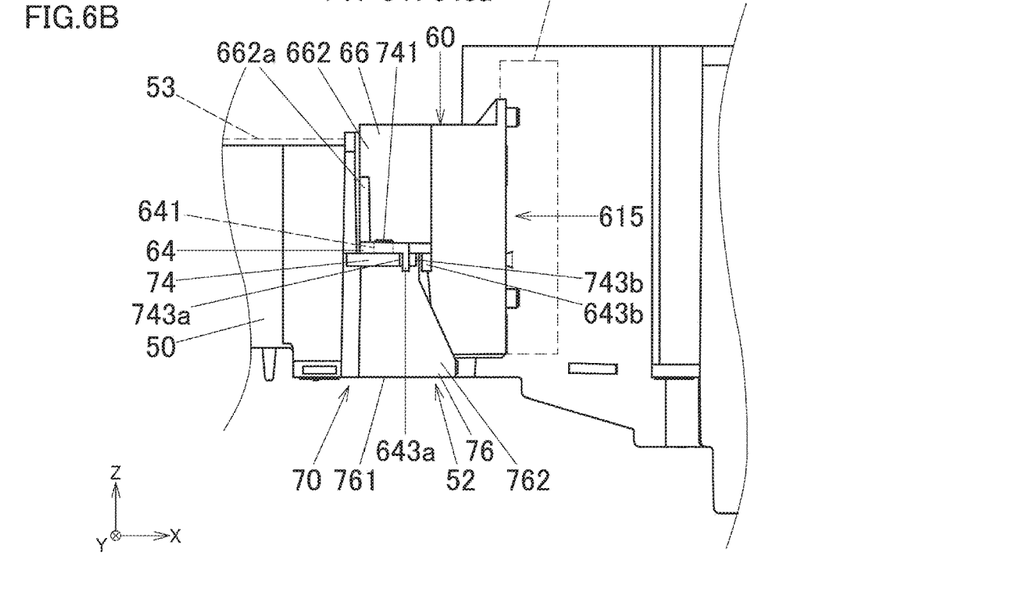
FIG. 6B is a side view showing a state in which the holding member is attached to the light source case according to the embodiment of the invention.

Next, a state will be described in which the holding member 60 is attached to the light source case 50. FIG. 6A is a plan view showing the state in which the holding member 60 is attached to the light source case 50. FIG. 6B is a side view showing the state in which the holding member 60 is attached to the light source case 50. FIG. 7 is a sectional view taken along a line VII-VII in FIG. 3 which shows the state in which the holding member 60 is attached to the light source case 50.

The holding member 60 is fixed to the attaching portion 70 from above towards below (from the positive direction towards the negative direction of the Z axis). The third flange portion 64 and the fourth flange portion 65, which are engaging portions, and the first flange portion 74 and the second flange portion 75, which are engaged portions, are formed so as to be detachably attached together in the direction of the Z axis via the hole portion 641 and the elongated hole portion 651 and the positioning projections 741, 751. When fixing the holding member 60 to the attaching portion 70, the positioning projection 741 of the first flange portion 74 is inserted into the hole portion 641 of the third flange portion 64, and the positioning projection 751 of the second flange portion 75 is inserted into the elongated hole portion 651 of the fourth flange portion 65 (refer to FIG. 6A). Thus, the holding member 60 is positioned highly accurately relative to the attaching portion 70 in relation to the direction of the X axis and the direction of the Z axis so that no positional deflection occurs.

A screw which is inserted through the hole portion 642 of the third flange portion 64 is screwed into the threaded hole 742 of the first flange portion 74, and a screw which is inserted through the hole portion 652 of the fourth flange portion 65 is screwed into the threaded hole 752 of the second flange portion 75. This fixes the third flange portion 64 to the first flange portion 74 and the fourth flange portion 65 to the second flange portion 65 in the direction of the Z axis, and therefore, the holding member 60 is positioned highly accurately relative to the attaching portion 70 in the direction of the Z axis so that no positional deflection occurs.

When the holding member 60 is fixed to the attaching portion 70, a boundary plane where the first flange portion 74 is brought into abutment with the third flange portion 64 and a boundary plane where the second flange portion 75 is brought into abutment with the fourth flange portion 65 are situated substantially at the same height as that of the reference axes A1, A2. Namely, the reference axis A1 of the attaching portion 70 coincides substantially with the reference axis A2 of the holding member 60. The red light source 352 is held on the holding member 60 in advance so that an axis of light of the range of red wavelengths emitted from the red light source 352 coincides substantially with the reference axis A2 of the through hole 601. This allows light of the range of red wavelengths emitted from the red light source 352 to enter an interior of the light source case 50 while being kept coinciding substantially with the reference axis A2.

In this way, the holding member 60 is positioned highly accurately relative to the attaching portion 70 in relation to the directions of the X, Y and Z axes. In particular, in this embodiment, the reference axis A2 which coincides substantially with the axis of light of the range of red wavelengths is formed so as to lie substantially on the same plane as the lower surface 64b of the third flange portion 64 and the lower surface 65b of the fourth flange portion 65, and the reference axis A1 which constitutes an axis of an optical path within the light source case 50 is formed so as to lie substantially on the same plate as the upper surface 74a of the first flange portion 74 and the upper surface 75a of the second flange portion 75. Due to this, the holding member 60 is fixed to the attaching portion 70 based on the positions of the reference axis A1 and the reference axis A2 in the direction of the Z axis, which can reduce effectively dimensional variations and an assembling error of the holding member 60 and the attaching portion 70 in the direction of the Z axis.

As shown in FIG. 7, the abutment surface 62 and the abutted surface 72 are brought into abutment with each other via the sealing member 63 which is compressed. The abutment surface 62 and the abutted surface 72 face each other while being inclined so as to form an acute angle, for example, an angle of 5° relative to the direction of the Z axis (the second direction) which constitutes a holding surface to which the parts (the optical parts such as the red light source 352, the collective lens group 353 and the like) are held. Those parts have their optical axes in the first direction which is substantially at right angles to the holding surface. The abutment surface 62 and the abutted surface 72 are inclined at an angle at which a lower end portion 631 (an end portion in the negative direction of the Z axis) of the sealing member 63, not compressed, which enters the attaching portion 70 is prevented from being brought into contact with upper end portions 721, 532 (end portions in the positive direction of the Z axis) of the abutted surface 72 of the attaching portion 70 which enter the holding member 60 when the third flange portion 64 and the fourth flange portion 65 are brought into engagement with the first flange portion 74 and the second flange portion 75, respectively, from the positive direction of the Z axis (also, refer to FIGS. 4 and 5).

Since the sealing member 63 is flexible, the sealing member 63 can expand and contract when a force is exerted thereon and taken away therefrom. A thickness of the sealing member 63 which is not compressed, that is, an initial thickness of the sealing member 63 (a height from the abutment surface 62 to the top surface a1 in FIG. 5) is thicker or greater than a distance between the abutment surface 62 and the abutted surface 72 shown in FIG. 7. The distance between the abutment surface 62 and the abutted surface 72 is longer or greater than the height of the rib portions 621a to 621d. Thus, when the holding member 60 is fixed to the attaching portion 70, a gap between the abutment surface 62 and the abutted surface 72 (including the fixing plate 531), which are each formed into the quadrangular ring-like shape, can be sealed up in an ensured fashion by means of the resilient force of the sealing member.

As shown in FIGS. 6A and 6B, when the holding member 60 is fixed in place, the frame portion 66 is brought into abutment with the attaching portion 70 so as to cover the attaching portion 70 from one end side thereof which is a positive side of the Z axis. The frame portion 76 is brought into abutment with the holding member 60 so as to cover the holding member 60 from the other side thereof which is the positive side of the Z axis.

Thus, while the configurations of the holding member 60 and the light source case 50 of the projector 100 according to the embodiment have mainly been described heretofore, the attaching direction of the holding member 60 is not limited to the direction of the Z axis. Thus, the holding member 60 can be attached to the light source case 50 from another direction which is at right angles to the direction of the X axis in which the holding member 60 and the attaching portion 70 of the light source case 50 are arranged, and hence, the holding member 60 can be attached to the light source case 50 from, for example, the direction of a Y axis. As this occurs, the engaged portion of the attaching portion 70 has a positioning projection which is provided so as to rise in the direction of the Y axis, and a hole portion is formed in the engaging portion of the holding member 60 in such a way as to penetrate the engaging portion in the direction of the Y axis, so that the positioning projection can be inserted into the hole portion. Thus, the abutment surface and the abutted surface can be formed so as to be inclined relative to the direction of the Y axis in which the holding member 60 is fixed.

The attaching direction of the holding member 60 is not limited to the directions described in the embodiment such as the direction of the Z axis and the direction of the Y axis which are at right angles to the direction of the X axis, and hence, the holding member 60 can be attached to the light source case 50 in other directions which are different from the direction of the X axis. As this occurs, too, the attaching portion 70 and the holding portion 60 are made to be detachably attached together in the attaching direction and can be given an abutment surface and an abutted surface which are inclined relative to the attaching direction.

The positioning projections 741, 751 are provided on the first flange portion 74 and the second flange portion 75, respectively, so as to rise in the direction in which the holding member 60 is attached (the direction of the Z axis). However, other constructions may be adopted, provided that the holding member 60 can be attached from the direction in which the abutment surface 62 and the abutted surface 72 are inclined.

In this embodiment, the configuration has been described in which the holding member 60 which holds the collective lenses and the red light source 352 is fixed to the light source case 50, and this configuration can be applied to cases where an opening portion (in this embodiment, the hole portion which is formed by the fixing plate 531 and the bottom portion 711) is provided in a case, and other parts or units are fixed in the case with good accuracy while ensuring that the opening portion holds a dust preventive property.

Thus, as has been described heretofore, the light source unit 250 and the projector 100 of the embodiment of the invention includes the holding member 60 which has the abutment surface 62 which is provided on the sealing member 63 and the engaging portion (the third flange portion 64, the fourth flange portion 65) to hold the parts and the light source case 50 which has the abutted surface 72 which is brought into abutment with the abutment surface 62 via the sealing member 63 and the engaged portion (the first flange portion 74, the second flange portion 75) which is brought into engagement with the engaging portion to hold the holding member 60. The abutment surface 62 and the abutted surface 72 are inclined while facing each other. Thus, even in a case where the holding member 60 and the attaching portion 70 are fixed together from the direction of the Z axis which differs from the direction of the X axis in which the holding member 60 and the attaching portion 70 are arranged, it is possible to prevent the occurrence of a failure of the sealing member 63 such as separation, twisting, positional deflection or the like thereof. Additionally, the sealing member 63 can seal up the gap between the abutment surface 62 and the abutted surface 72 in an ensured fashion. Thus, it is possible to enhance the attaching accuracy and the reliability of the sealing construction.

In the embodiment of the invention, the sealing member 63 is described as being disposed on the abutment surface 62 of the holding member 60. However, the invention is not limited to this configuration. The sealing member 63 may be disposed on the abutted surface of the light source case 50. Alternatively, the sealing member 63 may be disposed on both the abutment surface 62 of the holding member 60 and the abutted surface 72 of the light source case 50.

In the embodiment of the invention, the engaged portion (the first flange portion 74, the second flange portion 75) is described as including the cylindrical positioning projections 741, 751 and the engaging portion (the third flange portion 64, the fourth flange portion 65) is described as including the hole portion 641 and the elongated hole portion 651 which are formed therein so that the positioning projections 741, 751 are inserted therethrough, respectively. Additionally, the engaged portion may include further a positioning projection which is formed near a center of the lower plate portion 761 of the light source case 50 (below the reference axis A1 which is positioned substantially at the center of the cut-out portion 71). As this occurs, an elongated hole portion is provided in a lower surface of the holding member 60.

By adopting this configuration, when fixing the holding member 60 on which the sealing member 63 is disposed to the light source case 50, the positioning projection on the lower plate portion 761 of the light source case 50 is inserted through the elongated hole portion in the lower surface of the holding member 60. Thereafter, the positioning projections 741, 751 are inserted through the hole portion 641 in the third flange portion 64 and the elongated hole portion 651 in the fourth flange portion 65, respectively. Thus, by adopting this configuration, the holding member 60 can be attached to the attaching portion 70 more easily, and the holding member 60 can be positioned highly accurately in relation to the direction of the X axis and the direction of the Y axis so that the holding member 60 is prevented from being deflected relative to the attaching portion 70.

With the light source unit 250 in which the engaging portion and the engaged portion are formed so as to be detachably attached together in the second direction which differs from the first direction, and the abutment surface 62 and the abutted surface 72 are inclined relative to the second direction, even when a plurality of parts or units are attached to the light source unit 50, the attaching portion 70 can still be provided, whereby the light source unit 250 including many functions and configurations can be formed easily.

With the light source unit 250 in which the abutment surface 62 and the abutted surface 72 are inclined at the angle at which the lower end portion 631 of the sealing member 63 which enters the attaching portion 70 is prevented from being brought into contact with upper end portions 721, 532 of the abutted surface 72 of the light source case 50 which enter the holding member 60 when the engaging portion is brought into engagement with the engaged portion from the second direction, it is possible to prevent the occurrence of a failure of the sealing member 63 such as separation, twisting and positional deflection thereof in the process of fixing the holding member 60 to the light source case 50.

With the light source unit 250 in which the holding member 60 has the frame portion 66 which is brought into abutment with the light source case 50 from the one side of the first direction, and the light source case 50 has the frame portion 76 which is brought into abutment with the holding member 60 from the other side of the first direction, at least the abutment portions are sealed up, thereby making it possible to improve the sealing construction.

With the light source unit 250 in which the abutment surface 62, the abutted surface 72 and the sealing member 63 are each formed into the ring-like shape around the periphery of the part holding portion 61 which holds the parts (the red light source 352, the collective lens group 353), the gap between the abutment surface 62 and the abutted surface 72 which are each formed into the ring-like shape can be sealed up in an ensured fashion.

With the light source unit 250 in which the rib portions 621a to 621d are provided on the abutment surface 62, even though a biasing force is exerted about the Y axis in the rotating direction in FIG. 7 because the resilient force of the sealing member 63 is partially weakened or an external load is applied, the top surfaces al of the rib portions 621a to 621d are brought into abutment with the abutted surface 72, whereby the abutment surface 62 is prevented from being inclined excessively. Although the top surfaces al of the rib portions 621a to 621d are not parallel to the abutment surface 62, as long as they are formed parallel to the abutted surface 72, the top surfaces al can restrict the rotation of the holding member 60. Thus, the attaching accuracy of the holding member 60 can be maintained while maintaining the sealing construction.

With the light source unit 250 in which the sealing member 63 is flexible, the thickness of the sealing member when not compressed is thicker or greater than the distance between the abutment surface 2 and the abutted surface 72, and the distance between the abutment surface 62 and the abutted surface 72 is longer or greater than the height of the rib portions 621a to 621d, the gap between the abutment surface 62 and the abutted surface 72 can be sealed up in an ensured fashion by means of the resilient force of the sealing member 63.

The light source unit 250 includes the cylindrical positioning projections 741, 751 as the engaged portion and has the hole portion 641 and the elongated hole portion 651 through which the corresponding positioning projections 741, 751 are inserted as the engaging portion. Consequently, with the light source unit 250, the holding member 60 can be positioned highly accurately relative to the attaching portion 70 so that no positional deflection occurs.

With the light source unit 250 in which the holding member 60 holds the light emitting device (the red light source 352), the configuration of this embodiment can be applied to the holding member 60 which is required to be aligned accurately as an axis of light emitted light source is done to thereby making it possible to provide the light source unit 250 which can produce an image of good quality.

In the light source unit 250, the engaged portion includes the first flange portion 74 and the second flange portion 75, and the engaging portion includes the third flange portion 64 which is brought into abutment with the first flange portion 74 and the fourth flange portion 65 which is brought into abutment with the second flange portion 75. Further, in the light source unit 250, the boundary plane between the first flange portion 74 and the third flange portion 64 and the boundary plane between the second flange portion 75 and the fourth flange portion 65 are disposed in the position which corresponds to the height of the axis of light emitted from the light emitting device. Consequently, with the light source unit 250, the holding member 60 can be positioned highly accurately relative to the attaching portion 70 in the direction of the Z axis so that no positional deflection occurs.

While the embodiments of the invention have been described heretofore, these embodiments are presented as examples, and hence, there is no intention to limit the scope of the invention by the embodiments. These novel embodiments can be carried out in other various forms, and various omissions, replacements and modifications can be made without departing from the spirit and scope of the invention. Those resulting embodiments and their modifications are included in the spirit and scope of the invention and are also included in the scope of inventions claimed for patent under claims below and their equivalents.

What is claimed is:
1. A light source unit comprising:
a sealing member;

a holding member on which an abutment surface is formed, which has an engaging portion and which holds a part;

a case on which an abutted surface is formed which is brought into abutment with the abutment surface via the sealing member, which has an engaged portion which is brought into engagement with the engaging portion and which holds the holding member, wherein the abutment surface of the holding member and the abutted surface of the case face each other and are inclined relative to a holding surface which holds the part, and the abutted surface of the case is inclined so as to face a side where the holding member is inserted, the sealing member is disposed on the abutment surface or the abutted surface, wherein the engaging portion and the engaged portion are formed so as to be detachably attached together in a direction in which the holding member moves towards the abutted surface of the case, and wherein the abutment surface and the abutted surface are inclined so as to form an acute angle relative to the direction.

2. The light source unit according to claim 1, wherein
the part is an optical part having an optical axis which extends in a first direction which is substantially perpendicular to the holding surface, wherein
the the direction is a second direction.

3. The light source unit according to claim 2, wherein
the abutment surface and the abutted surface are inclined at an angle at which an end portion of the sealing member which enters the case is prevented from being brought into contact with an end portion of the abutted surface of the case which enters the holding member when the abutment surface is brought into engagement with the abutted surface from the second direction.

4. The light source unit according to claim 2, wherein
the holding member has a first frame portion which is brought into abutment with the case from one end side of the first direction, and wherein
the case has a second frame portion which is brought into abutment with the holding member from the other end side of the first direction.

5. The light source unit according to claim 1, wherein
the abutment surface, the abutted surface and the sealing member are each formed into a ring-like shape around a periphery of a part holding portion which holds the part.

6. The light source unit according to claim 1, having:
a rib portion which is provided on the abutment surface and whose top surface is parallel to the abutted surface.

7. A projector comprising:
the light source unit according to claim 1;
a display device on to which light source light from the light source unit is shone to thereby form image light;
a projection-side optical system for projecting the image light emitted from the display device on to a screen; and
a control unit for controlling the display device and the light source unit.

8. A light source unit comprising:
a sealing member which is flexible;
a holding member on which an abutment surface is formed, which has an engaging portion and which holds a part;
a case on which an abutted surface is formed which is brought into abutment with the abutment surface via the sealing member, which has an engaged portion which is brought into engagement with the engaging portion and which holds the holding member, wherein the abutment surface of the holding member and the abutted surface of the case face each other and are inclined relative to a holding surface which holds the part, and the abutted surface of the case is inclined so as to face a side where the holding member is inserted;

a rib portion which is provided on the abutment surface and whose top surface is parallel to the abutment surface and the abutted surface; wherein a thickness of the sealing member when the sealing member is not compressed is thicker or greater than a distance between the abutment surface and the abutted surface, and wherein the distance between the abutment surface and the abutted surface is longer or greater than a height of the rib portion.

9. A light source unit comprising:
a sealing member;
a holding member on which an abutment surface is formed, which has an engaging portion and which holds a part;
a case on which an abutted surface is formed which is brought into abutment with the abutment surface via the sealing member, which has an engaged portion which is brought into engagement with the engaging portion and which holds the holding member, wherein the abutment surface of the holding member and the abutted surface of the case face each other and are inclined relative to a holding surface which holds the part, and the abutted surface of the case is inclined so as to face a side where the holding member is inserted, wherein the engaged portion includes a cylindrical positioning projection, and wherein the engaging portion is a hole portion through which the positioning projection is inserted.

10. A light source unit comprising:
a sealing member;
a holding member on which an abutment surface is formed, which has an engaging portion and which holds a part;
a case on which an abutted surface is formed which is brought into abutment with the abutment surface via the sealing member, which has an engaged portion which is brought into engagement with the engaging portion and which holds the holding member, wherein the abutment surface of the holding member and the abutted surface of the case face each other and are inclined relative to a holding surface which holds the part, and the abutted surface of the case is inclined so as to face a side where the holding member is inserted, wherein the holding member holds a light emitting device.

11. The light source unit according to claim 10, wherein
the engaged portion includes a first flange portion and a second flange portion, wherein
the engaging portion includes a third flange portion which is brought into abutment with the first flange portion and a fourth flange portion which is brought into abutment with the second flange portion, and wherein
a boundary plane between the first flange portion and the third flange portion and a boundary plane between the second flange portion and the fourth flange portion are disposed in a position which lies at a height of an axis of light emitted from the light emitting device.

12. A light source unit comprising:
a sealing member;

a holding member on which an abutment surface is formed, which has an engaging portion and which holds a part;

a case on which an abutted surface is formed which is brought into abutment with the abutment surface via the sealing member, which has an engaged portion which is brought into engagement with the engaging portion and which holds the holding member, wherein a boundary plane between the engaging portion of the holding member and the engaged portion of the case is a surface substantially parallel to a surface which is orthogonal to a holding surface holding the part, the abutment surface of the holding member and the abutted surface of the case face each other and are inclined relative to a holding surface, and the abutted surface of the case is inclined so as to face a side where the holding member is inserted.

* * * * *